United States Patent [19]

Guttery et al.

[11] Patent Number: 5,435,528
[45] Date of Patent: Jul. 25, 1995

[54] POROUS PLUG STRUCTURE FOR ALUMINUM FURANCES

[75] Inventors: James R. Guttery, Florence; Gary B. Parker, Moulton; Douglas V. Stewart, Florence, all of Ala.

[73] Assignee: Reynolds Metals Company, Richmond, Va.

[21] Appl. No.: 226,615

[22] Filed: Apr. 12, 1994

[51] Int. Cl.$^6$ .............................................. C22B 9/05
[52] U.S. Cl. .................................... 266/220; 75/680; 266/265
[58] Field of Search .................... 266/220, 265; 75/265

[56] References Cited

U.S. PATENT DOCUMENTS

| | | |
|---|---|---|
| 3,834,685 | 9/1974 | Ziemkiewicz et al. |
| 4,053,147 | 10/1977 | Moser et al. |
| 4,331,471 | 5/1982 | Langenfeld et al. |
| 4,632,367 | 12/1986 | LaBate |
| 4,903,948 | 2/1990 | Wolf et al. |
| 5,007,366 | 4/1991 | Handler |
| 5,093,289 | 3/1992 | Braetsch et al. |
| 5,330,160 | 7/1994 | Eisermann et al. ............... 266/220 |

OTHER PUBLICATIONS

*Use of Ceramic Coatings to Enhance Performance of Metal Furnace Components*, John Hellander, Industrial Heating, The Journal of Thermal Technology, Business-News Publishing Co., Jul. 1990.
*A Two-Year User's Experience with Porous Plug Fluxing in a Modern Casting Facility*, J. R. Guttery, Light Metals 1993, The Minerals, Metals & Materials Society, © 1992, pp. 899–905.

Primary Examiner—Melvyn Andrews
Attorney, Agent, or Firm—Alan M. Biddison

[57] ABSTRACT

A porous plug assembly for use in a vessel containing molten metal, such as a melting furnace or a holding furnace, for introducing fluxing or other gases into the molten metal. The porous plug assembly includes a frustoconical porous refractory core member that is enclosed around its side and bottom by a non-porous refractory lining. Positioned about the outer surface of the non-porous refractory lining is a metallic outer liner, preferably made from inconel, which includes a ceramic anti-corrosion coating. A gas distribution pipe, which also can be made from inconel, extends upwardly through the bottom of the metallic outer liner, through the non-porous refractory lining, and into the interior of the core member for introducing a fluxing gas therein. Surrounding the intermediate, non-porous refractory lining and the metallic outer liner is a refractory nest block. The fluxing gas passes through the porous core member and exits at the top thereof to enter the molten metal melt. A plurality of such porous plugs are distributed over the bottom wall of a melting or a holding furnace for improved distribution of the fluxing gas throughout the melt.

12 Claims, 1 Drawing Sheet

POROUS PLUG STRUCTURE FOR ALUMINUM FURANCES

BACKGROUND OF THE INVENTION

1. Field of the Invention

The present invention relates to porous refractory plugs adapted to be positioned in walls of aluminum melting or holding furnaces for introduction into molten aluminum of gases for fluxing and other purposes. More particularly, the present invention relates to an improved porous refractory plug structure that has significantly improved service life by providing additional protection for metallic components of such plugs through the use of ceramic coatings.

2. Description of the Related Art

The introduction of gases into molten aluminum was previously performed by inserting into the molten aluminum a metal pipe, sometimes referred to as a wand, and causing the gases to flow through the pipe and into the molten metal. The gases were provided to remove from the melt undesired components, such as inclusions, dissolved hydrogen, certain metallic elements such as sodium and lithium, and the like. Because of the sizes of the common melting and holding furnaces, which can be as much as thirty or more feet across, the wand technique is relatively inefficient because the gas that issues from the wand contacts only a small portion of the molten metal, and the wand must therefore be moved about the molten metal mass so that substantially the entire mass of molten metal is exposed to and contacted by the gas.

One way in which the dispersion into a molten metal of fluxing gases can be more effectively accomplished is by providing a series of refractory porous plugs in the furnace wall, most commonly in the bottom wall of the furnace. Each plug is in communication with a source of fluxing gas, which passes through the plug and directly or indirectly into the molten metal mass. By providing a sufficient number of such porous plugs distributed over the furnace bottom, fluxing of the melt can be more quickly and more efficiently performed. Early refractory porous plug structures are disclosed in U.S. Pat. No. 3,834,685, which issued on Sep. 10, 1974, to Leonard P. Ziemkiewicz, et al., and in U.S. Pat. No. 4,053,147, which issued on Oct. 11, 1977, to Robert Moser et al.

One form of porous plug structure that has been found to be particularly suitable for use in aluminum melting and holding furnaces is disclosed in an article entitled, "A Two Year User's Experience with Porous Plug Fluxing in a Modern Casting Facility," published in *Light Metals* 1993, edited by Subodh K. Das, published by The Minerals, Metals, and Materials Society, copyright 1992. As disclosed in that article, the porous refractory plug structure includes a frustoconical central porous core member that is surrounded at its sides and bottom with a non-porous refractory lining material. Positioned around an outer portion of the non-porous refractory material is a metallic protective lining, sometimes referred to as a "can," for confining a fluxing gas that enters the central porous core member and for preventing contact of the fluxing gas with the adjacent refractory furnace material. Inconel is disclosed as the material from which the metallic lining is made, and because inconel, a nickel-based alloy, has well-known corrosion-resistant properties it was thought that long life of the porous plug structure was assured.

Recent experience with such porous refractory plugs has shown that the inconel liner, despite its intrinsic corrosion resistance, is in time subject to deterioration by certain fluxing gases such as chlorine, which can reach the inconel liner through cracks that can occur in the non-porous refractory liner. Further, although the effective service life of such plug structures is of the order of about 2 years, it was desired that the effective service life be further increased, to reduce the servicing interval at which replacement of the plugs was required. It has been shown that the ceramic coating bonds to both the liner material and the adjacent refractory, effectively sealing this joint and impending the flow of flux gas along this surface.

It is an object of the present invention to overcome the shortcomings of the prior art porous refractory plug structures.

It is a further object of the present invention to provide a porous refractory plug for use in aluminum melting and holding furnaces wherein the plug structure has an operating life of at least about three years.

SUMMARY OF THE INVENTION

Briefly stated, in accordance with one aspect of the present invention, a porous plug for permitting the introduction into an aluminum melt of a fluxing gas is provided. The plug includes a porous refractory core member that has a top wall, at least one side wall, and a bottom wall. A conduit is provided for admitting gas into the interior of the plug, the conduit extending into the plug a predetermined distance. An outer, substantially non-porous refractory lining extends over the side and bottom surfaces of the porous core member, the intermediate lining having an inner surface in contacting engagement with the side wall and bottom wall of the core member, and having an outer surface that is spaced from the inner surface. A metallic outer liner is provided and is in contacting relationship with the outer surface of the non-porous refractory lining. The metallic outer liner extends over and is in contact with the side and bottom walls of the non-porous refractory liner. The metallic outer liner includes a ceramic surface coating that provides enhanced protection of the metallic outer liner against chemical attack of the metal by gases that are introduced into the interior of the porous core member.

DESCRIPTION OF THE PREFERRED EMBODIMENTS

Figure 1:
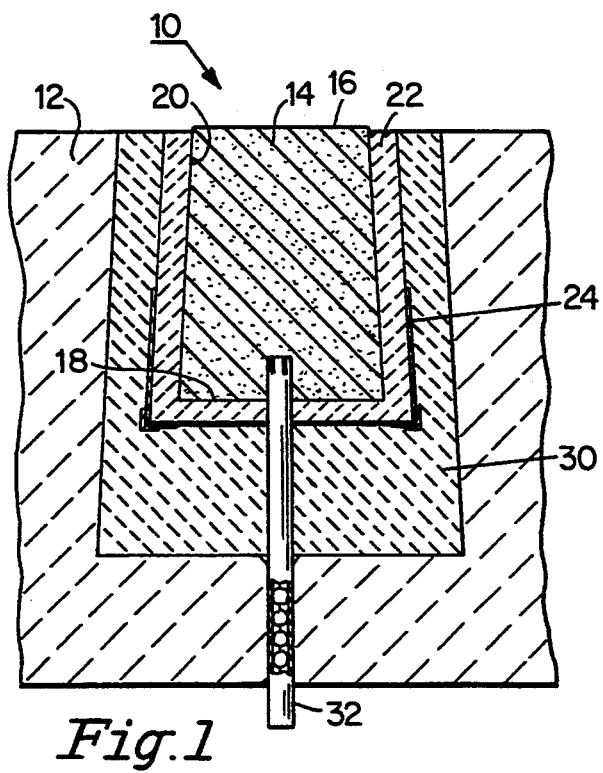
FIG. 1 is a fragmentary, cross-sectional, elevational view of a portion of a molten metal furnace bottom, showing a porous refractory plug structure in accordance with the present invention positioned in the refractory lining of the furnace bottom.

Referring now to the drawings, and particularly to FIG. 1 thereof, there is shown a porous refractory plug 10 in accordance with the present invention, positioned in the bottom wall 12 of a an aluminum melting furnace. Plug 10 includes a porous refractory central core member 14 that is of generally frustoconical form and that has a substantially flat, circular top surface 16, a circular bottom surface 18 having a larger diameter than that of top surface 16, and a continuous inclined side wall 20 that extends between the peripheral surfaces of each of top surface 16 and bottom surface 18. Although illustrated and described herein as of frustoconical form, having only a single, continuous side wall, those skilled in the art will appreciate that the central core member can be made in other shapes, if desired, such as square, rectangular, pyramidal, and the like, having a plurality of side walls.

Core member 14 has a porosity sufficient to permit the passage therethrough of a desired gas, such as a fluxing gas, which can be chlorine, but preferably the porosity is insufficient to permit penetration of core member 14 by the molten aluminum to which upper surface 16 of core member 10 is exposed when in position in a furnace wall. One type of refractory material that has been found to be a satisfactory material from which to make core member 14 is a material known commercially as "A94-AL," which is available from North American Refractories Co., of Cleveland, Ohio. The refractory material is pressed into the desired form and then is fired to provide its final shape and porosity. The porosity is a function of the grain size and the pressing techniques that are utilized, and it can be varied to suit particular applications. Core member 14 has a texture similar to that of common, high-alumina brick.

An intermediate, substantially non-porous refractory lining 22 may be provided around inclined side wall 20 and over the surface of bottom wall 18 of core member 14. Intermediate refractory lining 22 is preferably cast in place about the core member, to provide intimate contact between lining 22 and core member 14. One suitable material from which lining 22 can be made is commercially known as "Narcocast," which also is available from North American Refractories Co., of Cleveland, Ohio.

As shown in FIG. 1, intermediate refractory lining 22 terminates a short distance below top surface 16 of core member 14, of the order of from about one-eighth inch to about one-quarter inch. For a plug 10 having an outer diameter of about eight and three-eighths inches at top surface 16, and having a height of about fourteen inches, the thickness of intermediate refractory lining 22 can be of the order of about one inch or so.

Positioned around approximately the lower one-half of the outermost inclined side surface of intermediate, non-porous refractory lining 22 is a metallic outer liner 24 that is also of generally frustoconical form. Metallic liner 24 includes an inclined, continuous side wall 26 that is in contact with the outermost side surface of intermediate, non-porous refractory lining 22. Liner 24 also includes a bottom wall or base plate 28 that underlies and is in contact with the lowermost surface of intermediate, non-porous refractory lining 22. Preferably, metallic outer liner 24 is made from a corrosion-resistant material, such as inconel, although other suitable materials can also be employed.

To extend the effective operating life of the plug additional corrosion resistance can be provided for metallic outer liner 24. Preferably liner 24 is coated both inside and out with a corrosion resistant coating that is capable of resisting deterioration by chlorine and other gases. One suitable and preferred type of coating for liner 24 is a ceramic coating, such as a ceramic coating material known commercially as type MC-2000GR, which is a green metal, refractory and rare-earth oxide coating capable of withstanding a maximum surface temperature of 2000° F., and which is available from H & S Coatings, Inc., of Pittsburgh, Pa. The preferred ceramic coating material is a water-based composition that is applied by spraying onto the surface to be coated while the surface is at room temperature, and then drying the coating to provide a uniform, substantially three mil dry thicknes of the ceramic material on the entire surface of the metallic liner. Although the disclosed ceramic material is preferred, any other coating material with similar characteristics, such as the ability to adhere to inconel and to prevent corrosion, can also be used.

Cast around the assembly of core member 14, intermediate refractory liner 22, and metallic outer liner 24 is a refractory nest block 30 that serves to protect the plug structure and to provide an interface with the furnace bottom refractory material 12. Refractory nest block 30 can be made from a refractory material known commercially as "Narcon 93 AL," which also is available from North American Refractories Co., Cleveland, Ohio.

Extending upwardly through refractory nest block 30, through base plate 28 of metallic outer liner 24, and through the base portion of intermediate refractory lining 22 into core member 14 is a metallic pipe 32 that serves as the conduit for introducing the appropriate gas into porous central core member 14. Preferably, pipe 32 is also made from inconel, for corrosion resistance, and it is in contacting engagement with each of the several materials through which it passes to minimize leakage therebetween.

Gas pipe 32 extends into porous central core member 14 to introduce the treating gas into the melt within the furnace. The uppermost portion of pipe 32, which is within core member 14, can advantageously include a plurality of longitudinal slots 38 that extend downwardly from the uppermost surface of pipe 32 a predetermined distance to assist in the lateral distribution of the treating gas within core member 14 for more uniform flow of the gas outwardly of top surface 16 thereof.

Figure 2:
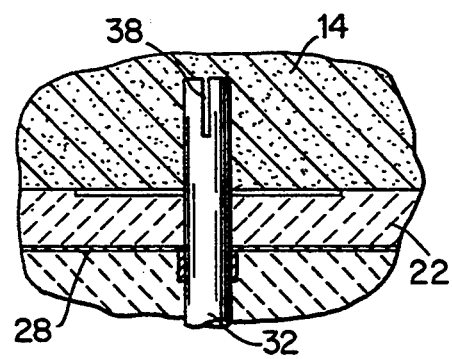
FIG. 2 is an enlarged fragmentary elevational view showing the position of a gas introduction pipe relative to the bottom wall of the refractory porous plug shown in FIG. 1.
Figure 3:
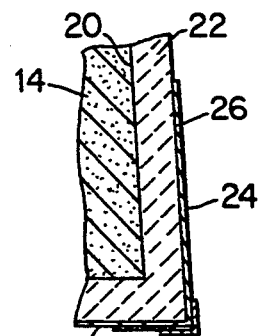
FIG. 3 is an enlarged fragmentary view of a lower corner of the refractory porous plug structure shown in FIG. 1.
Figure 4:
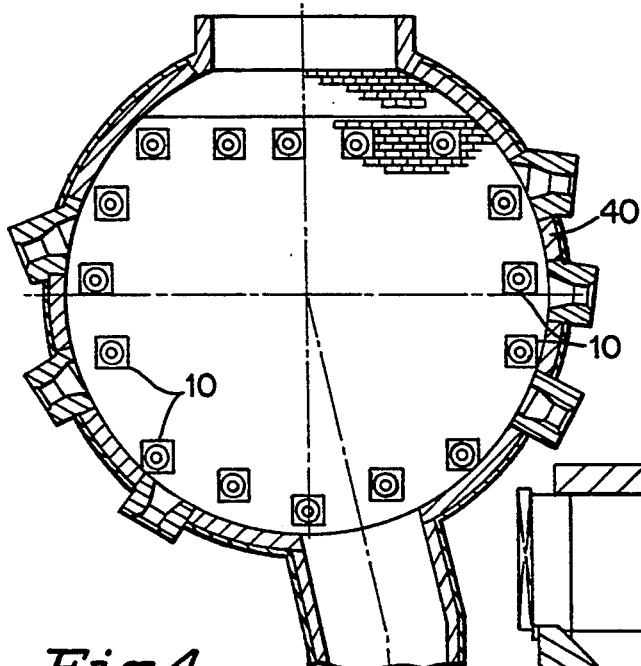
FIG. 4 is a top view, in cross section, through one form of aluminum melting furnace in which a plurality of porous plugs in accordance with the present invention are distributed over the bottom refractory wall thereof.

A preferred orientation of porous plugs 10 in accordance with the present invention, and having the structure shown in FIGS. 1 through 3, is shown in FIG. 4 for a melting furnace 40 of a type particularly adapted for the melting of aluminum. As shown, sixteen porous plugs 10 are positioned substantially equally about the outer periphery of the furnace vessel, within the bottom wall, to provide substantially equal distribution of the fluxing gas, which results in more uniform distribution of the gas within the molten aluminum, more efficient fluxing, and also provides some stirring action in the molten metal to further enhance the efficiency of the fluxing operation.

Figure 5:
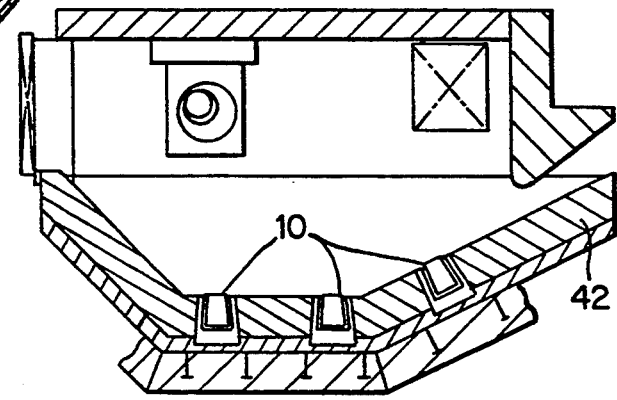
FIG. 5 is an elevational view, in cross-section, through one form of aluminum holding furnace in which a plurality of porous refractory plugs in accordance with the present invention have been installed in the bottom wall thereof.

FIG. 5 shows a cross section of an aluminum holding furnace 42 in which three porous plugs are shown in the lower wall in the furnace cross section illustrated.

Porous plugs having the structure herein illustrated and described, and including the protective ceramic anti-corrosion coating on the metallic outer liner, have been found to have considerably improved operating life, as compared with corresponding plug structures not including such a ceramic anti-corrosion coating. Whereas applicant's experience is that plugs not including the preferred anti-corrosion ceramic coating have an operating life of the order of about two years before they must be removed and replaced as a result of corrosion of the inconel outer liner, similarly constructed porous plugs that include a ceramic coating applied to the inconel sidewall and base as herein described have been in operation for three years and are still performing dependably. The ceramic coating, therefore, provides a substantial improvement in effective operating life for porous plugs in which such a coating has been applied, and based upon data presently available that improvement amounts to at least about a 50% increase in effective service life.

Although particular embodiments of the present invention have been illustrated and described, it would be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A porous refractory plug for use in a furnace for containing a molten metal and for admitting melt treatment gases into the molten metal, said plug comprising:
   a. a porous refractory core member having a top wall, at least one side wall, and a bottom wall;
   b. a conduit extending into the core member for admitting a gas into the interior of the core member for passage through the core member top wall and into a metallic melt that is in contact with the core member top wall;
   c. an intermediate, substantially non-porous refractory lining extending over a major portion of the at least one side wall and over the bottom wall of the core member, the intermediate lining having an inner surface in contacting relationship with the at least one side wall and the bottom wall of the core member, and having an outer surface spaced from the inner surface and defining at least one side wall and a bottom wall of the intermediate lining; and
   d. a metallic outer liner in contacting relationship with the outer surface of the intermediate lining and extending over the bottom wall and over at least a portion of the at least one side wall thereof, the metallic outer liner including a ceramic surface coating to prevent chemical attack of the outer liner, and which bonds to the liner and adjacent refractory materials to impede flow of flux gas along this surface.

2. A porous plug in accordance with claim 1 wherein the core member is of frustoconical shape, having a narrow end and a wide end, and oriented with the narrow end uppermost.

3. A porous plug in accordance with claim 1 wherein the core member has a flat top that is spaced above the intermediate refractory lining to define an unlined portion of the core member side wall to extend into a molten metal when the plug is installed in a metal-receiving furnace.

4. A porous plug in accordance with claim 1 wherein the intermediate lining is in contact with the at least one side wall and bottom wall of the core member to confine gas that is introduced into the core member to flow toward and to exit from the core member top wall.

5. A porous plug in accordance with claim 1 wherein the metallic outer liner extends over less than about 50% of the intermediate lining material outer surface.

6. A porous plug in accordance with claim 1 wherein the metallic outer liner has a thickness of about three-sixteenths inch.

7. A porous plug in accordance with claim 5 wherein the entire metallic outer liner is surface coated with a ceramic surface coating, including the inner and outer surfaces of the side wall and the inner and outer surfaces of the bottom wall.

8. A porous plug in accordance with claim 7 wherein the ceramic coating has a thickness of about three mils.

9. A porous plug in accordance with claim 1 wherein the core member is of frustoconical shape, having a narrow end and a wide end, and is oriented with the narrow end uppermost, wherein the intermediate lining is in contact with the at least one side wall and bottom wall of the core member to confine gas that is introduced into the core member to flow toward and to exit from the core member top surface, and wherein the metallic outer liner extends over less than about 50% of the intermediate lining material outer surface.

10. A porous plug in accordance with claim 9 wherein the metallic outer liner has a thickness of about three-sixteenths inch.

11. A porous plug in accordance with claim 1 wherein the metallic outer liner extends over substantially all of the intermediate lining material outer surface.

12. A porous plug in accordance with claim 1 wherein the core member is of frustoconical shape, having a narrow end and a wide end, and is oriented with the narrow end uppermost, wherein the intermediate lining is in contact with the at least one side wall and bottom wall of the core member to confine gas that is introduced into the core member to flow toward and to exit from the core member top surface, and wherein the metallic outer liner extends over substantially all of the intermediate lining material outer surface.

* * * * *